(12) United States Patent
Feuerstein et al.

(10) Patent No.: US 7,555,781 B2
(45) Date of Patent: *Jun. 30, 2009

(54) SECURITY COMPONENT FOR A COMPUTING DEVICE

(75) Inventors: Yehuda Feuerstein, Redmond, WA (US); Jared E. Pfost, Seattle, WA (US); Stephen J. Purpura, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 501 days.

This patent is subject to a terminal disclaimer.

(21) Appl. No.: 11/276,722

(22) Filed: Mar. 10, 2006

(65) Prior Publication Data

US 2006/0150253 A1 Jul. 6, 2006

Related U.S. Application Data

(63) Continuation of application No. 09/751,016, filed on Dec. 27, 2000, now Pat. No. 7,058,978.

(51) Int. Cl.
*H04L 9/00* (2006.01)
*H04L 9/32* (2006.01)
*G06F 7/04* (2006.01)

(52) U.S. Cl. .............................. 726/26; 726/27; 726/28; 726/29; 726/30; 713/187; 713/188; 713/189; 380/247; 380/248; 380/249

(58) Field of Classification Search ..................... 726/26
See application file for complete search history.

(56) References Cited

U.S. PATENT DOCUMENTS

| | | | |
|---|---|---|---|
| 6,415,280 B1 * | 7/2002 | Farber et al. ...................... 707/2 |
| 2002/0004917 A1 * | 1/2002 | Malcolm et al. ................. 714/4 |
| 2002/0083178 A1 * | 6/2002 | Brothers ..................... 709/226 |

OTHER PUBLICATIONS

U.S. Appl. No. 60/224,907 "System and Method for the Management of Secure Content on an HTTP Distribution Infrastructure", Brothers, Filed Aug. 11, 2000.
Bruschi, et al., "A Tool for Pro-Active Defense Against the Bugger Overrun Attack," ESORICS (Computer Security), Sep. 1998, pp. 17-31.
Curtin, "On Guard Fortifying Your Site Against Attack," available at <<www.webtechniques.com>>, Apr. 2000, pp. 46-50.
Juszczyszyn, "Domain and Type Enforcement Access Control Model in Firewall Systems," Information Systems Architecture and Technology (ISAT), 1998.
Smith, "Mandatory Protection for Internet Server Software," IEEE Computer Security Applications Conference, Dec. 1996, pp. 178-184.
Smith, "Sidewinder: Defense in Depth using Type Enforcement," International Journal of Network Management, Jul.-Aug. 1995, pp. 219-229.

* cited by examiner

*Primary Examiner*—Longbit Chai
(74) *Attorney, Agent, or Firm*—Lee & Hayes, PLLC

(57) ABSTRACT

A security component determines whether a request for a resource poses a security risk to a computing device and verifies the integrity of the requested resource before the request is allowed. For a request having arguments and a resource path with a filename that identifies the resource, the security component determines that the request does not pose a security risk if the resource path does not exceed a maximum number of characters, individual arguments do not exceed a maximum number of characters, the arguments combined do not exceed a maximum number of characters, and the filename has a valid extension. The security component verifies the integrity of a requested resource by formulating a descriptor corresponding to the resource and comparing the descriptor with a cached descriptor corresponding to the resource.

19 Claims, 9 Drawing Sheets

SECURITY COMPONENT FOR A COMPUTING DEVICE

RELATED APPLICATIONS

This application is a continuation of and claims priority to U.S. patent application Ser. No. 09/751,016 entitled "Security Component for a Computing Device" filed Dec. 27, 2000 to Feuerstein et al., the disclosure of which is incorporated by reference herein.

TECHNICAL FIELD

This invention relates to the operating security of computing devices and, in particular, to network servers and networked computing devices.

BACKGROUND

Computer systems are susceptible to operating system and application-level security compromises from intruders and backer-initiated security attacks. Networked computing systems in particular offer hackers a gateway to access and corrupt the computer system of an unsuspecting user connected to the network.

One such security attack is an unauthorized write and execute event on a network server. A "Trojan horse" is an example of such an attack in which malicious or harmful code is contained within an apparently harmless program or data. An intruder, via a network connection, surreptitiously uploads an .asp (active server page) file or other type of executable file onto a network server and executes the file with an administrative privilege of the server.

A similar and common attack attempts to infect a computing device with a virus. Once instantiated on an unsuspecting user's computer, a virus attempts to override system files and exploit or reconfigure the computer's operating system to alter the intended functionality and/or disable the computing device. Viruses can be transmitted by sending them as attachments to an email, by downloading an infected program from another site, or a virus can be present on a diskette or compact disk. Additionally, viruses are often designed to spread automatically to other computer users.

Another security attack attempts to cause a buffer overrun in a network server. This is initiated by a hacker directing a single, large universal resource locator (URL) to the network server to expose a deficiency in the handling of the URL. A buffer overrun can expose an opening to overwrite and/or replace a section of the memory with executable code intended to compromise the network server and any computing devices connected to the network server.

Many network architectures and network service providers are not designed with security as a priority, nor are the multiple possibilities for a security attack accounted for. As a result, network architectures and service providers have multiple single-points of failure that are susceptible to external security attacks. When an exploitable failure point is discovered in a network server or in a computer operating system, the entire network service and associated computing devices are at risk of a security compromise.

An example of an Internet server is Internet Information Server (IIS) which is implemented to facilitate administration of a network architecture that includes and interface with the Internet. Windows® 2000 Server integrates IIS at the operating system level. Windows® 2000 Server is an operating system licensed by Microsoft Corporation of Redmond, Wash.

When IIS is implemented as a networking service to interface a network architecture with the Internet, it inherently trusts the resources and data files stored within the network architecture. Furthermore, IIS relies upon its own security features to protect against security attacks and maintain the integrity of the resources and data files stored within the network architecture.

A security feature of IIS is to authenticate users requesting access to network resources before allowing the requested access. Unfortunately, security attacks can be initiated that circumvent IIS. A trusted and authenticated user, for example, can overwrite and/or corrupt a file stored on the network, either maliciously or inadvertently. Because IIS inherently trusts the resources and data files stored on the network in which IIS is implemented, a second authenticated user may be served the corrupted file because the integrity of the file itself is not verified.

SUMMARY

A security component determines whether a request for a resource poses a security risk and verifies the integrity of the requested resource before the request is allowed. On a front-end network server, a server component passes a request to access a resource stored on the network server to the security component that determines whether the request can be allowed without a security risk to the network server.

For a request, such as a resource locator having arguments and a resource path, the security component determines that the request does not pose a security risk if the resource path does not exceed a maximum number of characters, individual arguments do not exceed a maximum number of characters, the arguments combined do not exceed a maximum number of characters, and if a resource identifier has a valid extension.

The security component also verifies the integrity of the requested resource by formulating and comparing a descriptor corresponding to the resource to determine if the resource has been altered or overwritten. When a resource is downloaded to the network server from a back-end file server, a descriptor corresponding to the resource is formulated and stored in a data table along with an associated filename to identify the resource. To determine if the requested resource has been altered or overwritten, a descriptor corresponding to the resource is formulated at the time of the request and is compared to the descriptor stored in the data table. If the descriptors are equivalent, then the resource is determined to be reliable.

If, however, the descriptors are not equivalent, the security component can access the original version of the resource on the file server and formulate a descriptor corresponding to the original version of the resource to compare with the descriptor corresponding to the resource calculated at the time of the request. If the descriptors are equivalent, then the resource stored on the network server is determined to be reliable.

If the descriptors are not equivalent, indicating that the resource stored on the network server has been altered or overwritten, the original version of the resource stored on the file server can be copied to the network server to replace the suspect resource. After replacing the resource on the network server, the request for the resource can be allowed knowing that the resource is reliable.

Similarly, the security component verifies the integrity of a resource requested by an operating system executing on a computing device. The security component calculates a descriptor corresponding to the requested resource and compares the descriptor with a cached descriptor of the resource.

The cached descriptor is stored remotely on a server device linked to the computing device.

If the descriptors are equivalent, the resource is determined to be reliable and can be accessed by the operating system without a security risk to the computing device. If the descriptors are not equivalent, however, a copy of the resource stored on the server device can be copied to the computing device to replace the altered or overwritten resource. After replacing the resource on the computing device, the resource request can be allowed knowing that the resource is reliable.

BRIEF DESCRIPTION OF THE DRAWINGS

The same numbers are used throughout the drawings to reference like features and components.

DETAILED DESCRIPTION

The following technology describes systems and methods to implement an additional layer of security for a network server or an operating system in a computing device. A security component implements real-time resource request validation and/or resource integrity verification. The security component can be implemented independently or as a component of a larger application.

A security failure point for a network server can result from, for example, an operator error when configuring the server. For server configuration errors, and other server security deficiencies, a security component implements a second line of defense. The security component is easier to configure and implement than a server, and it is not likely that it would be configured incorrectly. It is also less likely that both a server and the security component would be miss-configured in a manner that opens the same security failure point. Additionally, a server can be manufactured and implemented having an unknown security failure point. The security component is a defense to an unknown security failure point. It is highly unlikely that the same security failure point would be implemented in both the server and the security component.

Figure 1:
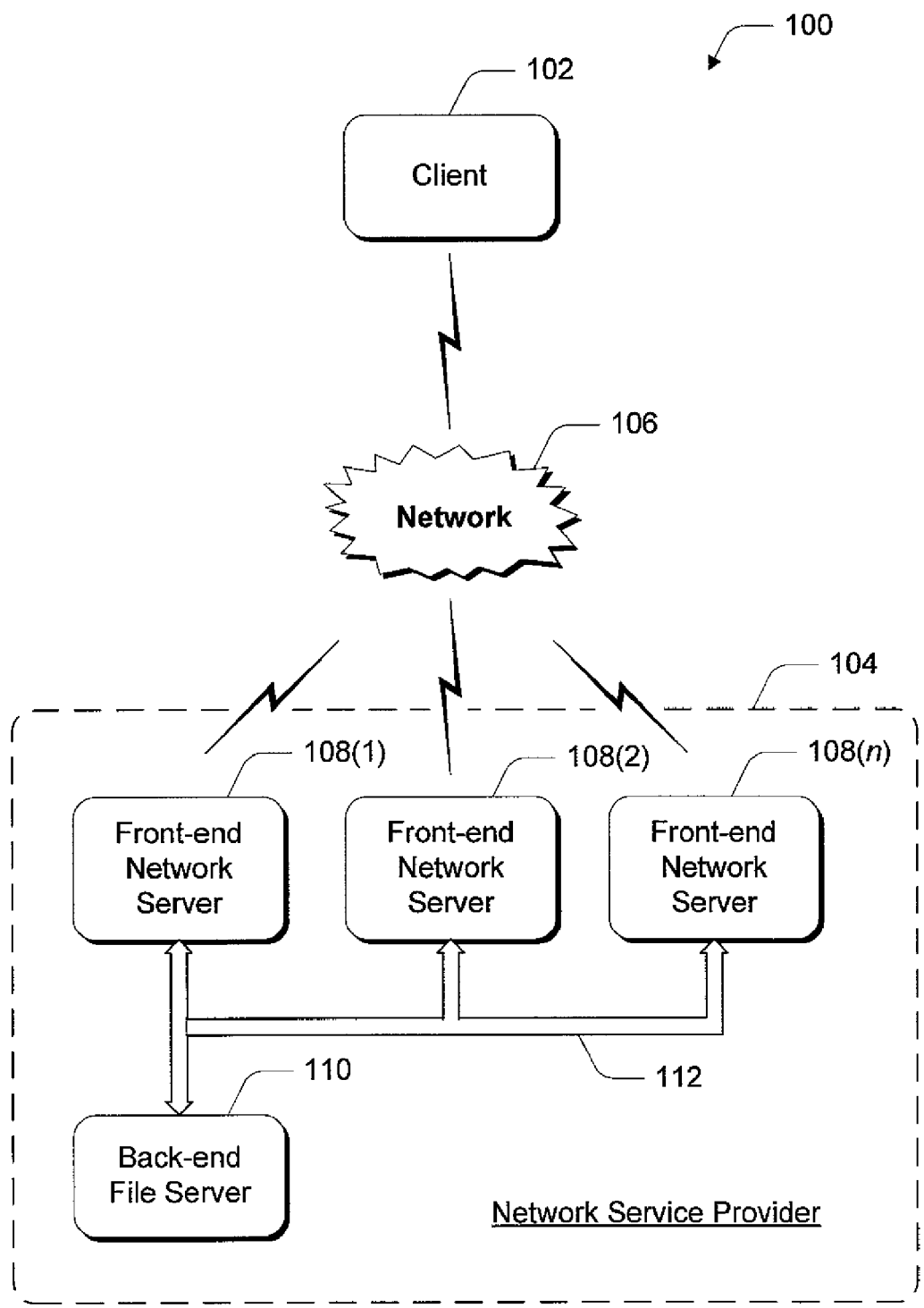
FIG. 1 is a block diagram of a network architecture.

FIG. 1 illustrates a network architecture 100 in which a user or client device 102 can access a resource or data file maintained by a network service provider 104. The client device 102 and the network service provider 104 are connected via a network 106, such as the Internet. The network service provider 104 has multiple front-end network servers 108(1 . . . n) and a single back-end file server 110. It is to be appreciated that the network architecture 100 can be implemented with multiple network service providers and multiple client devices, as well as each network service provider having any number of computing devices implemented as network servers and any number of communicatively linked file servers.

The file server 110 is connected to the network servers 108(1 . . . n) via a local area network (LAN) 112 over which the file server 110 copies resources and data files to the network servers 108(1 . . . n). A user or client device 102 can access the resources and data files from any one of the network servers 108(1 . . . n) via network 106. See the description of "Exemplary Computing System and Environment" below for alternate and specific examples of the network architectures and systems, computing devices, and components described herein.

Security Component System

Figure 2:
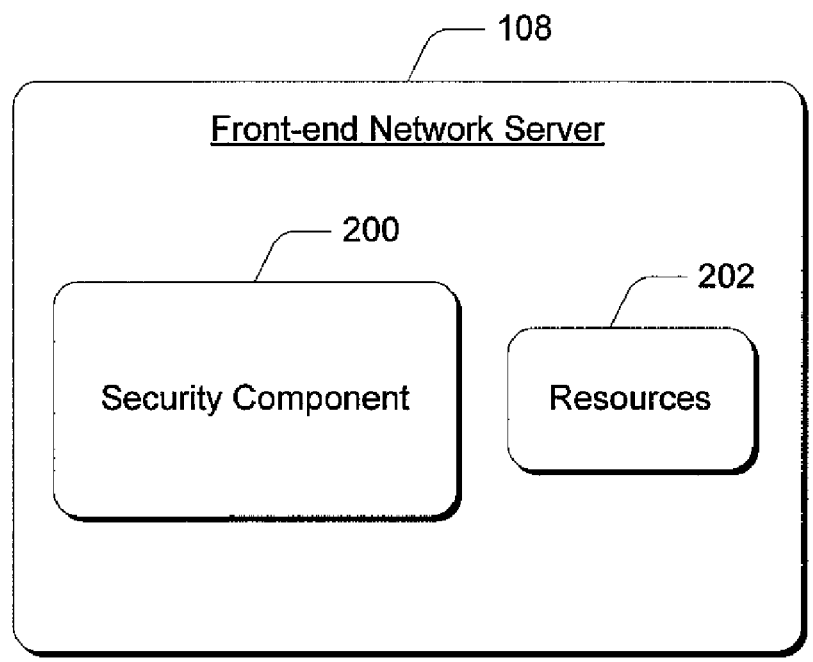
FIG. 2 is a block diagram that illustrates an implementation of a security component.
Figure 2:
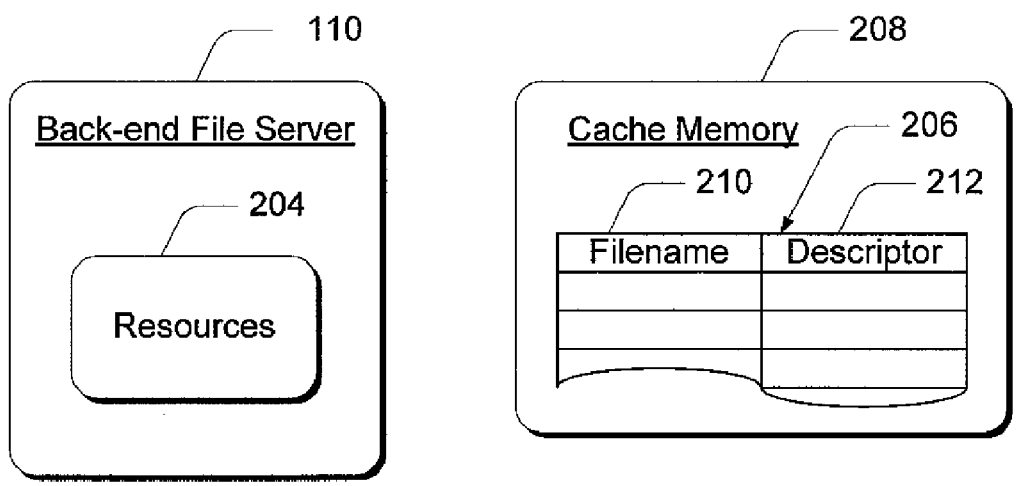

FIG. 2 illustrates an implementation of a security component within the network architecture 100 shown in FIG. 1. A front-end network server 108 has a security component 200 and resources 202. The resources 202 are a copy of the resources 204 that are stored on the back-end server 110 and downloaded to the network server 108.

The security component 200 determines whether a request for a resource 202 will pose a security risk to the network server 108. When the network server 108 receives a request for a resource 202, the security component 200 verifies the integrity of the resource 202 before allowing the resource request to be processed. Verifying the integrity of a requested resource prevents the execution of a resource or file that has been overwritten or otherwise altered in some manner. Resource integrity verification is a check to verify that a resource 202 on the network server 108 is what was replicated from the file server 110.

When the network server 108 receives a request for a resource 202, a data table 206 in a cache memory 208 stores a reference to the requested resource as filename 210. The security component formulates a descriptor 212 corresponding to the original of the resource 204 and stores the descriptor 212 in data table 206 where it is associated with the requested resource filename 210. A descriptor can be a hash function of the resource, a calculated checksum, a fingerprint, a code, a check value, or any other functional identifier that can be formulated to provide a basis for comparison of different instantiations of a resource.

Figure 3:
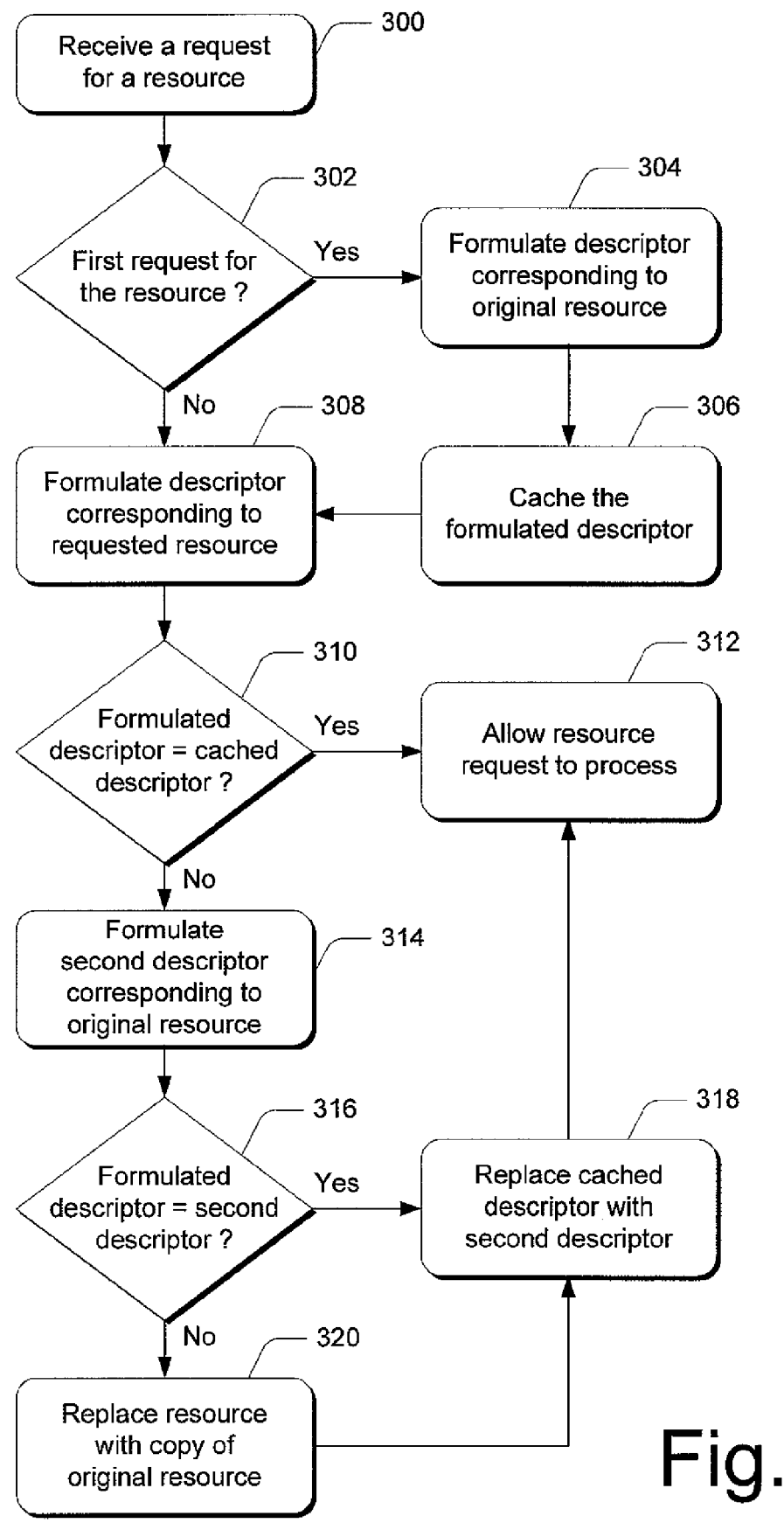
FIG. 3 is a flow diagram of a security component method.

FIG. 3 illustrates a security component method for the components shown in FIG. 2. At block 300, network server 108 receives a request for a resource 202 which is a replica of an original resource 204 stored on the file server 110. At block 302, the security component determines whether the request is the first for a particular resource. If the request is the first for the particular resource (i.e., "yes" from block 302), the security component formulates a descriptor corresponding to the original resource 204 at block 304, and caches the descriptor at block 306. If the request is not the first for the particular resource (i.e., "no" from block 302), or after caching the descriptor at block 306, the security component 200 formulates a descriptor corresponding to the requested resource 202 at block 308.

The security component 200 compares the formulated descriptor with the associated cached descriptor 212 in data table 206 at block 310. If the formulated descriptor and the cached descriptor are equivalent (i.e., "yes" from block 310), the resource request is allowed at block 312. If the formulated descriptor and the cached descriptor are not equivalent (i.e., "no" from block 310), the security component 200 formulates a second descriptor corresponding to the original resource 204 stored on the file server 110 at block 314.

The security component 200 compares the formulated descriptor with the second descriptor at block 316. If the formulated descriptor and the second descriptor are equivalent (i.e., "yes" from block 316), the cached descriptor 212 is replaced with the second descriptor at block 318, and the resource request is allowed at block 312. If the formulated descriptor and the second descriptor are not equivalent (i.e., "no" from block 316), the resource 202 on network server 108 is replaced with a copy of the original resource 204 from file server 110 at block 320. The cached descriptor 212 is replaced with the second descriptor at block 318, and the resource request is allowed at block 312.

Front-end Network Server Security

Figure 4:
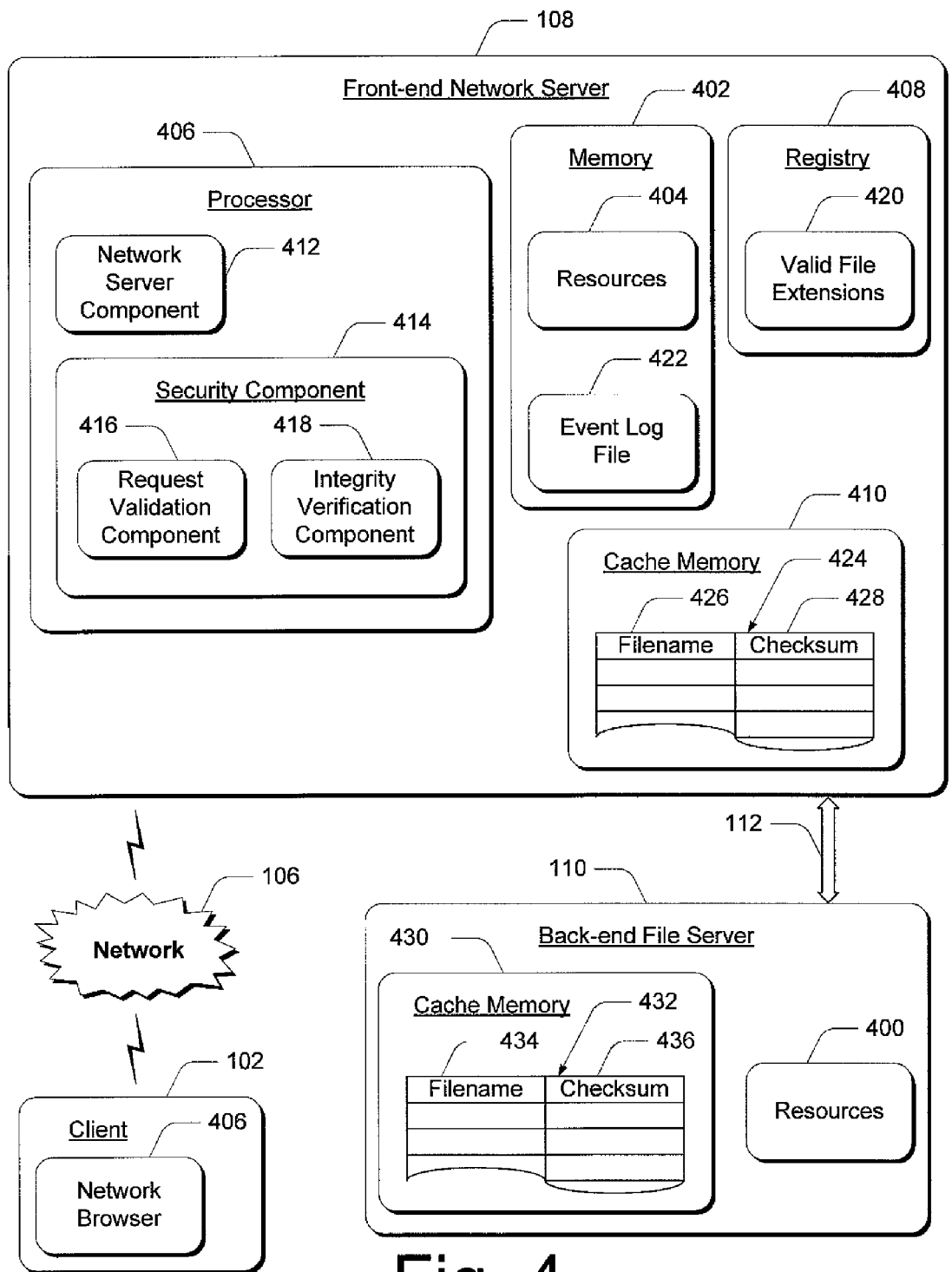
FIG. 4 is a block diagram that illustrates an implementation of a security component.

FIG. 4 illustrates an implementation of a security component within the network architecture 100 shown in FIG. 1. A front-end network server 108 is communicatively linked to a back-end file server 110 and a client device 102. The file server 110 maintains resources 400 that are downloaded via the LAN 112 to the network server 108.

The network server 108 has a memory 402 that stores a copy of the resources 404 that are downloaded from the file server 110. The client device 102 supports a network browser 406 that facilitates a user request to access the resources 404 stored on the network server 108 via the network connection 106.

The network server 108 also has a processor 406, a registry 408, and a cache memory 410. The processor 406 executes a network server component 412. An example of a network server component is Internet Information Server (IIS) which is an Internet technology integrated with the Windows® 2000 Server operating system. Windows® 2000 Server is an operating system licensed by Microsoft Corporation of Redmond, Wash.

The processor 406 also executes security component 414 which has a request validation component 416 and an integrity verification component 418. The security component 414, request validation component 416, and integrity verification component 418 can be implemented as a dynamic link library (DLL) file, an executable (.exe) file, a COM object, and the like.

In this example, the security component 414 is implemented as an Internet server application program interface (ISAPI) filter. ISAPI is a set of Windows® program calls that are integrated with IIS (e.g., the network server component 412). ISAPI allows a user to create a dynamic link library (DLL) application file that can be executed as part of the hypertext transport protocol (HTTP) in an application's process and address space.

A particular type of ISAPI DLL is an ISAPI filter (e.g., the security component 414) which, in this example, is designated to receive control from IIS over a resource or data file request from a client device 102. The security component 414 is registered with the network server application 412 and is called to evaluate a request for a resource 404 stored in memory 402 on the network server 108.

A request for a resource is initiated at the client device 102 and is transmitted to the network server 108 via the network 106. A request for a resource can designate a resource locator such as a uniform resource identifier (URI), a uniform resource locator (URL), and the like. In this example, the request is a URL that defines an address of a resource 404 accessible on the Internet at the network server 108. A requested resource can be a hypertext markup language (HTML) page, an image file, a program or application, or any other file supported by HTTP.

A URL is composed of a resource path and arguments. The resource path identifies the name of the protocol required to access a resource, a domain name that identifies a specific computer on a network, and a hierarchical description of a file location on the identified computer. On the World Wide Web, which uses the HTTP protocol, a resource is accessed with an HTTP Web browser (e.g., the network browser 406 supported by client device 102).

Request Analysis and Validation

The security component 414 evaluates resource requests with the request validation component 416 to prevent a buffer overrun of the network server 108. Resource requests are evaluated for the length of the resource path, a valid file extension, and appropriate argument length before the network server component 412 processes the resource request.

An example of a URL to request a resource from the network server 108 is:

https://www.networkserver.com/datafiles/
page.asp?argument1&argument2 which describes an active server page that is located on the computer having a domain name www.networkserver.com. The specific file for page.asp is located in the /datafiles directory.

The request validation component 416 evaluates the section of a URL before the arguments, delineated by the "?", for a maximum URL path length of 230 characters. In the example URL to request a resource, shown above, the section "https://www.networkserver.com/datafiles/page.asp" should be less than or equal to 230 characters.

The request validation component 416 also evaluates each argument (between the "&" signs) for a maximum argument length of 2068 characters and, in addition, the sum total argument length for all of the arguments for a maximum argument length of 2068 characters. In the example URL above, argument1 should be less than or equal to 2068 characters, argument2 should be less than or equal to 2068 characters, and the total of argument1 plus argument2 should be less than or equal to 2068 characters. The suggested argument lengths of 2068 characters, as well as other defined parameters described herein, are intended as optimum design details. It is to be appreciated that other parameters can be utilized to implement the technology.

The request validation component 416 evaluates each file extension of a resource identifier contained within a resource request (e.g., ".asp" in the above URL example) and will allow a maximum file extension length of four characters. Additionally, only resource requests with the following file extensions will be allowed to process: .asp, .css, .inc, .hdr, .ofx, .jpg, .jpeg, .bmp, .gif, .htm, .html, .dll, .ico, and .txt. The request validation component 416 verifies that a file extension in a resource request is valid by comparing the file extension with a list of valid file extensions 420 maintained in the registry 408 on the network server 108.

The network server 108 maintains a system event log file 422 in memory 402. If a URL of a resource request is found to be invalid by the request validation component 416, the security component 414 records the contents of the invalid URL, the originating Internet protocol (IP) address submitting the URL (e.g., the client device 102), and the date and time of the resource request in the event log file 422.

The security component 414 also provides notification to network server operations when a resource request of suspicious nature occurs, at which point a network server operator or facilitator can review the event log file 422. Event notifications are generated for:

A URL that indicates a file path with no file extension.

A URL that contains an invalid file extension.

A URL path length that exceeds 230 characters.

A URL having an argument that exceeds the argument length limit of 2068 characters.

A URL having an argument list that exceeds the total argument length limit of 2068 characters.

In the event of an invalid URL, the security component 414 directs the resource request to an alternate file or URL that contains a "file not found" message which is displayed at the client device 102. An example of an alternate URL message is an HTTP "404 Not Found" error.

Resource Integrity Verification

The security component 414 evaluates resource requests with the integrity verification component 418 to verify the integrity of a requested resource before the resource request is processed by the network server application 412. Additionally, the integrity verification component 418 prevents the execution of an unauthorized file uploaded onto the network server 108. Resource integrity verification is a check to verify that a resource 404 stored in memory 402 on the network server 108 is what was copied onto the network server 108 from the back-end file server 110.

The integrity verification component 418 formulates a descriptor corresponding to a resource 404 that is requested by a client device 102. In this example, a descriptor is a calculated checksum corresponding to a resource. Typically, a checksum is a count of the number of bits in a transmission unit that is included with the unit so that a receiver can determine whether the correct number of bits are received. Cyclic redundancy checking is a method of checking for errors in data that has been transmitted on a communications link. A sending device applies a 16- or 32-bit polynomial to a block of data that is to be transmitted and appends the resulting cyclic redundancy code (CRC) to the block. The receiving end applies the same polynomial to the data and compares its result with the result appended by the sender. If they agree, the data has been received successfully, and if not, the sender can be notified to resend the block of data.

In the present example, the integrity verification component 418 applies cyclic redundancy checking to calculate a CRC32 (a 32-bit cyclic redundancy code) checksum for a requested resource 404. To provide a basis for resource checksum comparison, the network server 108 maintains a data table 424 in cache memory 410. The data table 424 stores a filename 426 as a reference to each resource 404 and a checksum value 428 for each filename 426. The table is initially populated with a filename and an associated checksum when a resource request is received. The security component formulates a checksum 428 corresponding to the original of the resource 400 and stores the checksum 428 in the data table 424 where it is associated with the requested resource filename 426.

Alternatively, the file server 110 can have a memory 430 to maintain a data table 432. The data table 432 stores a filename 434 as a reference to each resource 404 and a checksum value 436 for each filename 434. The table is populated with a filename and an associated checksum when a resource 400 is downloaded from the back-end file server 110 and stored in memory 402 on the front-end network server 108.

With this implementation, a unique value for each resource can be compared to verify resource integrity before processing a resource request. Furthermore, verifying resource integrity with filename 426 and checksum 428 in data table 424 stored in cache memory 410 does not require having to access file server 110 each time a resource is verified. The checksum values 428 in data table 424 can be updated periodically to ensure the reliability of each associated resource stored on network server 108.

When a resource 404 is requested, a checksum is calculated for the requested resource and the calculated checksum is compared to the checksum value 428 for the corresponding filename 426 in data table 424. If the calculated checksum for a requested resource 404 matches the checksum value 428 for corresponding filename 426, the requested resource is determined to be reliable. If the calculated checksum for the requested resource 404 does not match the checksum value 428 for corresponding filename 426, the resource 404 stored in memory 402 on network server 108 is considered to have been compromised or overwritten.

The security component 414 alerts network server operations in the event of a request for a resource that cannot be verified for integrity. Event notifications are generated if:

The requested resource 404 on network server 108 is newer than the same resource on file server 110. This would indicate a significant likelihood that the newer data resource 404 has been overwritten by a hacker.

The requested resource 404 exists on network server 108 but not on file server 110. This would indicate a significant likelihood that a resource or data file has been uploaded to the network server 108 by an intruder.

The requested resource 404 on network server 108 is older then the same resource on file server 110. This is likely a file replication malfunction in that the file server 110 did not copy a newer version of the resource to the network server 108.

The requested resource 404 exists on file server 110 but not on network server 108. This could either be a file replication malfunction, or a hacker may have deleted the resource from the network server 108.

The requested resource 404 does not exist on either the file server 110 or the network server 108. This likely indicates that a user or client 102 has book-marked an Internet hyperlink that is no longer valid. Operations is alerted of an event, however, because the situation may indicate some type of security attack worth investigating.

The requested resource 404 went through two different erroneous states in a row, such as the resource does not exist on the network server 108 when initially requested, but then exists as a newer resource than the same resource on file server 110 when requested a second time.

The scenarios for processing or denying a resource or data file request as determined by the request validation component 416 and the integrity verification component 418 are described below with reference to FIGS. 6-8 which illustrate a flow diagram of a security component 414 method.

Operating System Security

Figure 5:
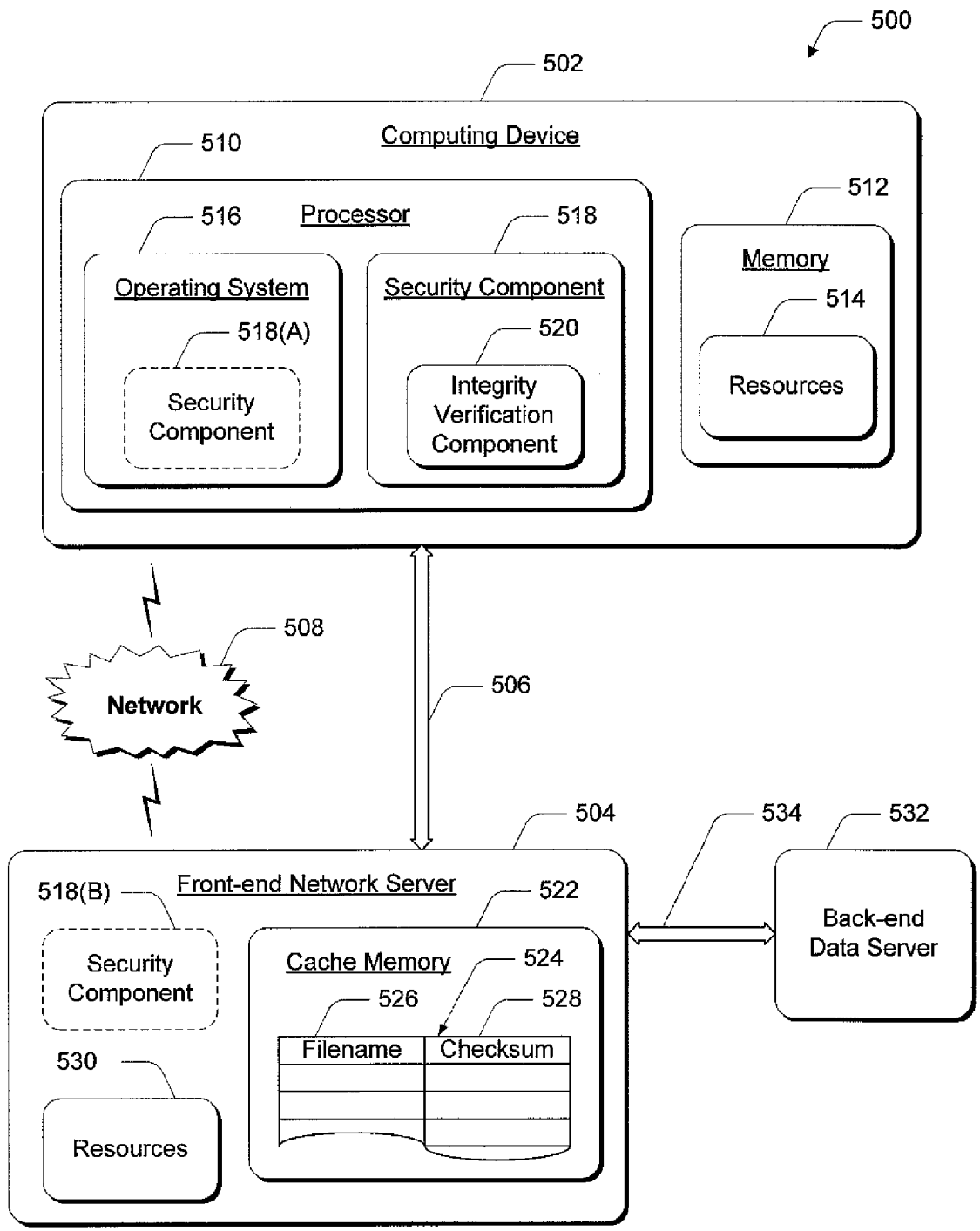
FIG. 5 is a block diagram that illustrates an implementation of a security component.

FIG. 5 illustrates an implementation of a security component to monitor resource requests for an operating system in a computing device. In network architecture 500, a computing device 502 is communicatively linked with a network server 504 via a LAN connection 506 or a network connection 508, such as the Internet. See the description of "Exemplary Computing System and Environment" below for alternate and specific examples of the network architectures and systems, computing devices, and components described herein.

Computing device 502 has a processor 510 and a memory 512. Memory 512 stores resources 514. Processor 510 executes an operating system 516 and a security component 518. In this example, security component 518 is implemented as an independent, executable application. Alternatively, security component 518 can be implemented as a component of the operating system 516 which is illustrated by the dashed-line security component 518(A). Security component 518 can also be implemented as an independent application on network server 504 which is illustrated by the dashed-line security component 518(B).

Security component 518 has an integrity verification component 520 that verifies the integrity of a resource 514 before the processor 510 accesses the resource. The integrity verification component 520 applies cyclic redundancy checking to calculate a CRC32 (a 32-bit cyclic redundancy code) checksum for a resource 514.

To provide a basis for resource comparison, network server 504 has a cache memory 522 that stores a data table 524. The data table 524 maintains a filename 526 for each associated resource 514. The data table 524 also has an associated checksum value 528 for each filename 526. Additionally, network server 504 can store a copy of the resources 514 in resources 530. The security component 518 calculates the checksums 528 for the resources 514 and stores the checksums 528 in data table 524 on the network server 504. Alternatively, a back-end data server 532 communicatively linked with network server 504 via a network connection 534 can store the resources 530 and the checksums 528 in data table 524 on network server 504.

A unique value for each resource can be compared to verify the integrity of a resource 514 before the processor 510 accesses the resource. If a calculated checksum for a particular resource 514 matches the checksum 528 for the corresponding system filename 526 stored in data table 524 on the network server 504, the resource 514 is determined to be reliable. If the calculated checksum for the particular resource 514 does not match the checksum 528 for the corresponding system filename 526 stored in the data table 524, the resource 514 is considered to have been compromised or overwritten and is unreliable. In the event that a resource 514 is considered to have been compromised or overwritten, the resource 514 can be replaced with a copy of the resource from resources 530 stored on network server 504.

Security Component Method Implementation

Figure 6:
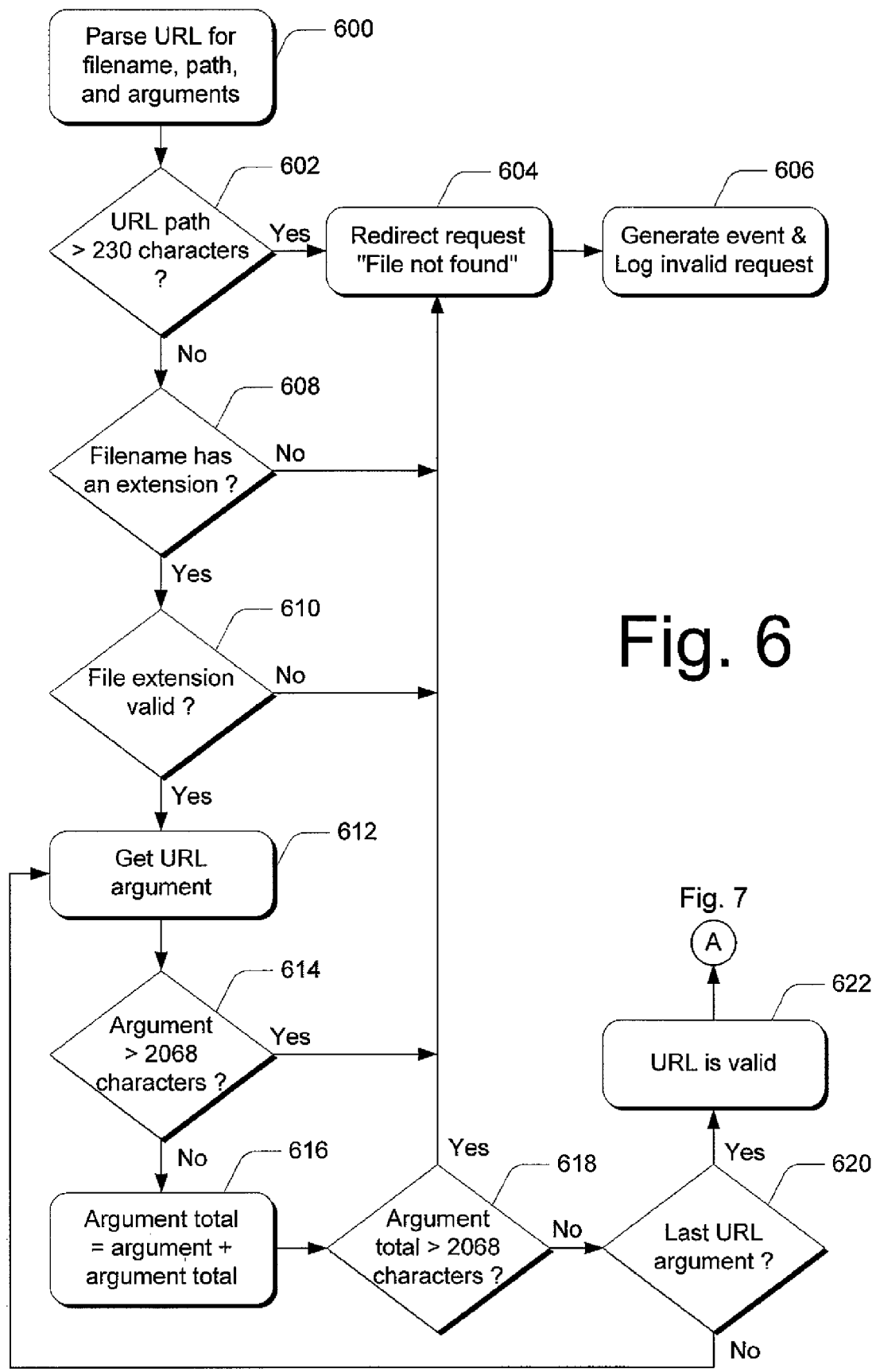
FIG. 6 is a flow diagram of a security component method for request validation.

FIG. 6 illustrates a security component method for resource request (e.g., URL) analysis and references components of the network architecture illustrated in FIG. 4. At block 600, security component 414 parses a resource request to distinguish the filename, path, and argument components of the URL. At block 602, the security component 414 determines the URL path length.

If the URL path length is greater than 230 characters (i.e., "yes" from block 602), the resource request is deemed invalid. The resource request is redirected to an HTTP 404 "File not found" message at block 604. Additionally, security component 414 generates a notice of a security event and records the contents of the invalid URL, the originating IP address submitting the URL, and the date and time of the resource request in an event log file 422.

If the URL path is less than or equal to 230 characters (i.e., "no" from block 602), the filename is evaluated to determine if it has a file extension identifier at block 608. If the filename does not have an extension (i.e., "no" from block 608), the resource request is directed to the "File not found" message at block 604 and a security event is generated and recorded at block 606.

If the filename has an extension (i.e., "yes" from block 608), the extension is evaluated to determine if it is valid at block 610. The security component 414 determines whether the extension is four or less characters and whether the extension is an allowed format by comparing the extension with the list of valid file extensions 420 maintained in the registry 408. If the filename extension is not valid (i.e., "no" from block 610), the resource request is directed to the "File not found" message at block 604 and a security event is generated and recorded at block 606.

If the filename extension is valid (i.e., "yes" from block 610), the security component 414 gets an argument component of the URL at block 612 and determines the number of characters in the argument at block 614. If the number of characters in the argument is greater than 2068 characters (i.e., "yes" from block 614), the resource request is directed to the "File not found" message at block 604 and a security event is generated and recorded at block 606.

If the number of characters in the argument is less than 2068 characters (i.e., "no" from block 614), a variable "argument total" is incremented by the number of argument characters at block 616. The security component 414 determines whether the sum total of all the argument characters in the URL is greater than 2068 at block 618. If the sum total of argument characters is greater than 2068 (i.e., "yes" from block 618), the resource request is directed to the "File not found" message at block 604 and a security event is generated and recorded at block 606.

If the sum total of argument characters is less than or equal to 2068 (i.e., "no" from block 618), the security component 414 determines whether all of the URL argument components have been evaluated at block 620. If not all of the URL arguments have been evaluated (i.e., "no" from block 620), the security component 414 gets the next argument component of the URL at block 612. The method described with respect to blocks 612-620 is repeated until all of the URL arguments have been evaluated. If all of the URL arguments have been evaluated (i.e., "yes" from block 620), the URL is deemed to be a valid resource request at block 622.

Figure 7:
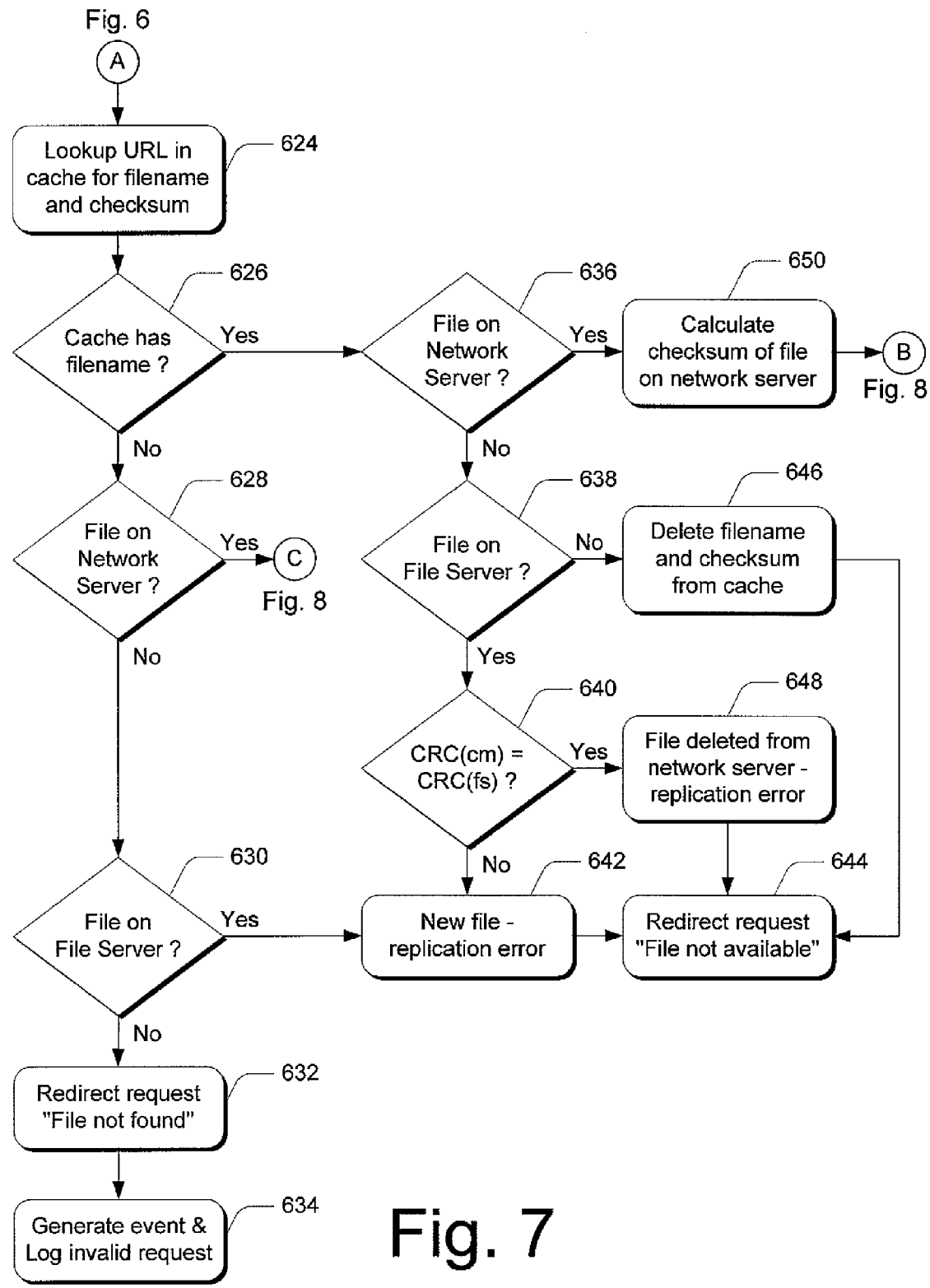
FIG. 7 is a flow diagram of a security component method for resource integrity verification.

FIG. 7 is a continuation of the security component method and illustrates a method for resource integrity verification. The described method also references components of the network architecture illustrated in FIG. 4. At block 624, the security component looks up the resource request filename in the filename and checksum data table 424 stored in cache memory 410 on the network server 108.

If the filename has not been stored in cache memory 410 (i.e., "no" from block 626), the security component 414 determines whether the associated resource is stored on the network server 108 in resources 404 at block 628. If the resource is not stored on the network server 108 (i.e., "no" from block 628), the security component 414 determines whether the resource is stored on the file server 110 in resources 400 at block 630.

If the resource is also not stored on the file server 110 (i.e., "no" from block 630), the resource request is redirected to an HTTP 404 "File not found" message at block 632. Additionally, the security component 414 generates a notice of a security event and records the contents of the invalid resource request, the originating IP address submitting the request, and the date and time of the resource request in the event log file 422 at block 634.

If the requested resource is an active server page (i.e., the resource request includes a filename extension ".asp") and the request is determined to be invalid, a "404 Not Found" response is sent to the requesting client device 102. The response is a redirection script to an "/Errors/PageNotFound.htm" and the physical path to the requested active server page is nulled out so that the ASP engine in the network server application 412 fails to resolve the virtual path. If the "/Errors/PageNotFound.htm" is also found to be invalid, a "404 Not Found" is still returned with the same HTML as found in "PageNotFound.htm." Therefore, if a hacker is able to modify "PageNotFound.htm", it will appear as if the page was restored or not modified.

If the requested filename has been stored in cache memory 410 (i.e., "yes" from block 626), the security component 414 determines whether the associated resource is stored on the network server 108 at block 636. If the requested resource is not stored on the network server 108 (i.e., "no" from block 636), the security component 414 determines whether the resource is stored on file server 110 at block 638.

If the resource is stored on file server 110 (i.e., "yes" from block 638), the security component 414 compares the associated filename checksum 428 in cache memory 410 with a calculated checksum for the resource stored on the file server 110 at block 640. In block 640, CRC(cm) identifies the checksum value 428 stored in cache memory 410 and CRC(fs) identifies the calculated checksum value for the associated resource stored on file server 110.

If the checksum values for the resource are not equivalent (i.e., "no" from block 640), or if the requested resource is on file server 110 (i.e., "yes" from block 630), the security component 414 concludes that a new resource has been created on file server 110, but has not been downloaded to the network server 108 indicating that a replication error has occurred at block 642. That is, the resource is on file server 110 but has not yet been copied to the network server 108. At block 644, the security component 414 redirects the resource request to a "File not available" message.

If the requested resource is not stored on the file server 110 (i.e., "no" from block 638), the security component 414 deletes the associated filename 426 and checksum 428 from data table 424 stored in cache memory 410 on network server 108 at block 646. At block 644, the security component 414 redirects the resource request to a "File not available" message.

If the checksum values for the resource are equivalent (i.e., "yes" from block 640), the security component 414 concludes that the requested resource has been deleted from the network server 108 and that the resource has not been replaced by file server 110 indicating that a replication error has occurred at block 648. At block 644, the security component 414 redirects the resource request to a "File not available" message.

If the requested resource is stored on network server 108 (i.e., "yes" from blocks 636 and 628), the security component 414 calculates a checksum for the resource stored on the network server 108 at blocks 650 and 652 (FIG. 8) respectively.

Figure 8:
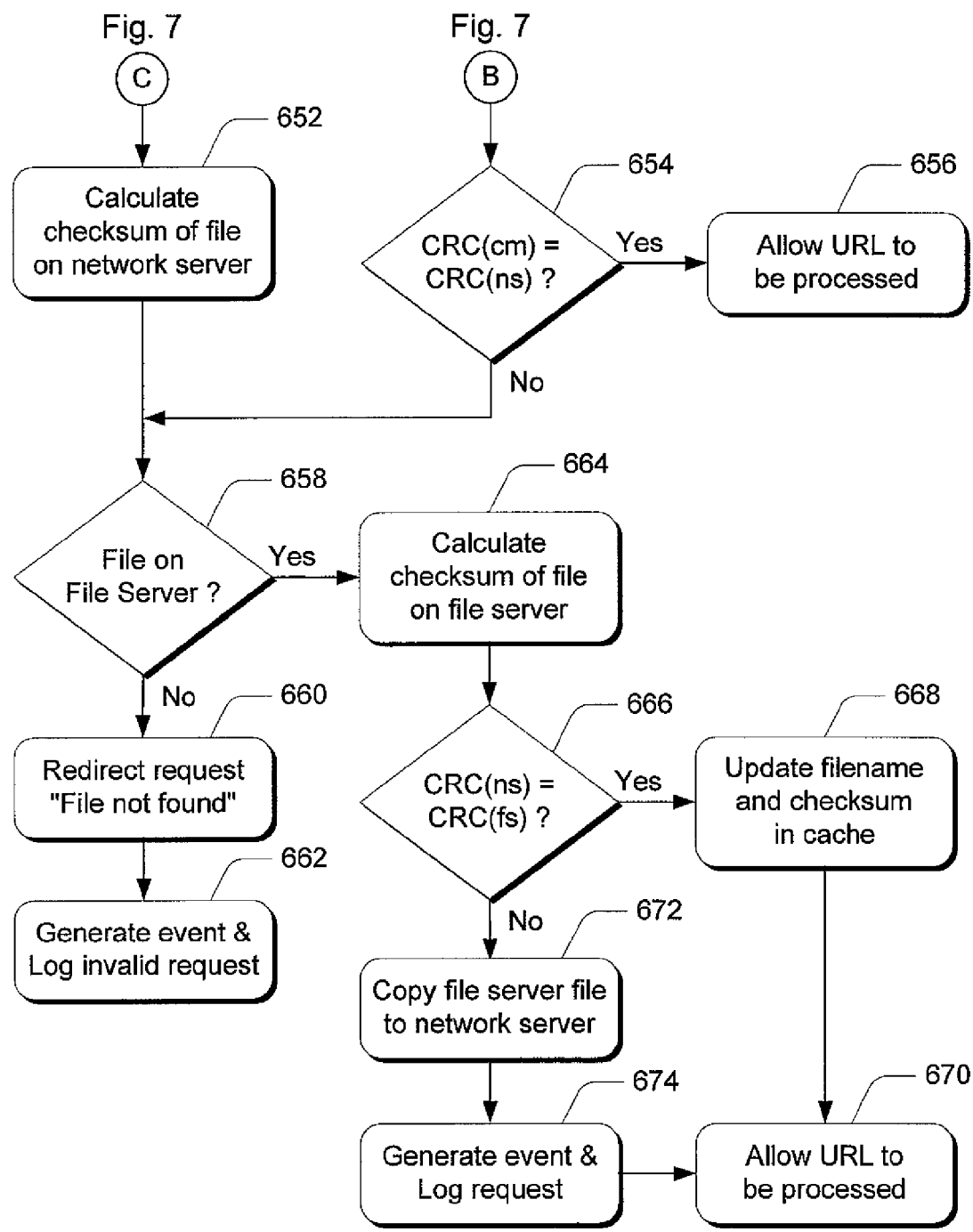
FIG. 8 is a continuation of the flow diagram for resource integrity verification illustrated in FIG. 5.

FIG. 8 is a continuation of the security component method illustrated in FIG. 7 and also references components of the network architecture illustrated in FIG. 4. The security component 414 compares the associated resource checksum 428 in cache memory 410 with the calculated checksum for the resource stored on network server 108 at block 654. In block 654, CRC(cm) identifies the checksum value 428 stored in cache memory 410 and CRC(ns) identifies the calculated checksum value for the associated resource stored on network server 108. If the checksum values for the resource are equivalent (i.e., "yes" from block 654), the resource request is allowed to be processed at block 656. That is, the security component 414 passes the valid resource request back to the network server application 412 to be processed.

If the checksum values for the resource are not equivalent (i.e., "no" from block 654), the security component 414 determines whether the requested resource is stored on file server 110 at block 658. Additionally, security component 414 also determines whether the requested resource is stored on file server 110 at block 658 after block 652.

If the requested resource is not on file server 110 (i.e., "no" from block 658), the resource request is redirected to an HTTP 404 "File not found" message at block 660. Additionally, the security component 414 generates a notice of a security event and records the contents of the invalid resource request, the originating IP address submitting the request, and the date and time of the resource request in the event log file 422 at block 662.

If the requested resource is stored on file server 110 (i.e., "yes" from block 658), the security component 414 calculates a checksum for the resource stored on file server 110 at block 664. The security component 414 compares the calculated checksum for the resource stored on file server 110 with the calculated checksum for the resource stored on network server 108 (from blocks 650 or 652) at block 666. In block 666, CRC(fs) identifies the calculated checksum for the resource stored on file server 110 and CRC(ns) identifies the calculated checksum value for the resource stored on network server 108.

If the checksum values for the resource are equivalent (i.e., "yes" from block 666), the security component 414 updates the associated filename 426 and checksum 428 for the requested resource in data table 424 stored in cache memory 410 on network server 108 at block 668. The resource request is allowed to be processed at block 670. That is, the security component 414 passes the valid resource request back to the network server application 412 to be processed.

If the checksum values for the resource are not equivalent (i.e., "no" from block 666), the security component 414 downloads a copy of the resource on file server 110 to network server 108 at block 672. At block 674, a security event is generated and recorded and the resource request is allowed to be processed at block 670.

Although FIGS. 6-8 illustrate a security component method with reference to providing security for a network server as illustrated in FIG. 4, it is to be appreciated that the security component method is applicable to providing security for an operating system in a computing device as illustrated in FIG. 5. Furthermore, it is to be appreciated that these are only two examples of an implementation of the security component described herein, and that those skilled in the art can implement the security component to provide security for other network systems, computing devices, and computer components in differing configurations and network architectures.

The security component described herein detects a change in a resource or data file and ensures a safe version of the resource for a requesting user or client device. The method of URL analysis and resource integrity verification is transparent to an end user or client device. If any resource requested by a user or client device is missing or corrupt, the security component will display a "File not found" or "File not available" message so that a hacker or intruder will not know whether an attempted security attack was successful or not.

Exemplary Computing System and Environment

Figure 9:
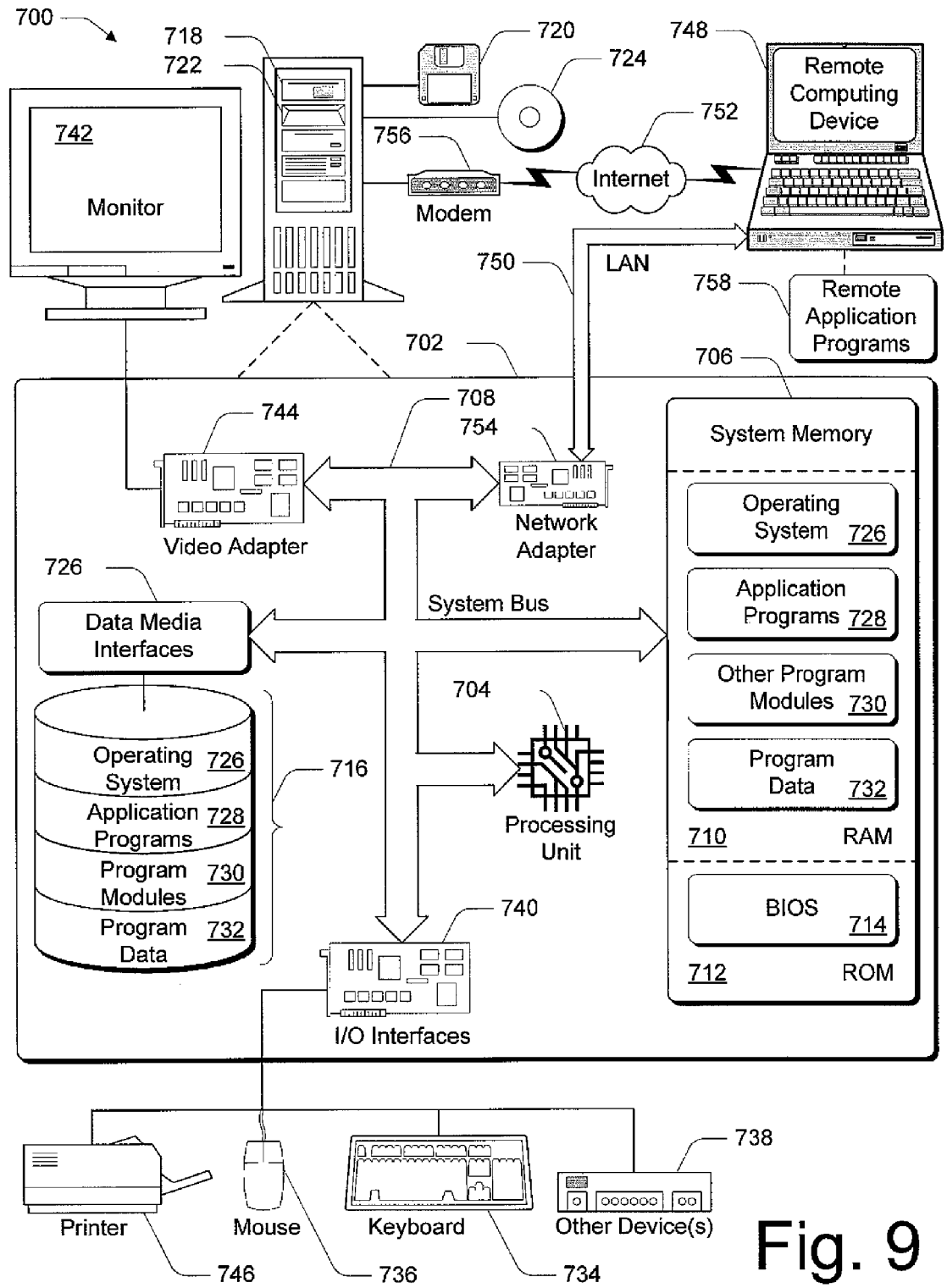
FIG. 9 is a diagram of a computing system and environment that can be utilized to implement the technology described herein.

FIG. 9 illustrates an example of a computing environment 700 within which the computer, network, and system architectures described herein can be either fully or partially implemented. Exemplary computing environment 700 is only one example of a computing system and is not intended to suggest any limitation as to the scope of use or functionality of the network architectures. Neither should the computing environment 700 be interpreted as having any dependency or requirement relating to any one or combination of components illustrated in the exemplary computing environment 700.

The computer and network architectures can be implemented with numerous other general purpose or special purpose computing system environments or configurations. Examples of well known computing systems, environments, and/or configurations that may be suitable for use include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The security component may be described in the general context of computer-executable instructions, such as program modules, being executed by a computer. Generally, program modules include routines, programs, objects, components, data structures, etc. that perform particular tasks or implement particular abstract data types. The security component may also be practiced in distributed computing environments where tasks are performed by remote processing devices that are linked through a communications network. In a distributed computing environment, program modules may be located in both local and remote computer storage media including memory storage devices.

The computing environment 700 includes a general-purpose computing system in the form of a computer 702. The components of computer 702 can include, by are not limited to, one or more processors or processing units 704, a system memory 706, and a system bus 708 that couples various system components including the processor 704 to the system memory 706.

The system bus 708 represents one or more of any of several types of bus structures, including a memory bus or memory controller, a peripheral bus, an accelerated graphics port, and a processor or local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

Computer system 702 typically includes a variety of computer readable media. Such media can be any available media that is accessible by computer 702 and includes both volatile and non-volatile media, removable and non-removable media. The system memory 706 includes computer readable media in the form of volatile memory, such as random access memory (RAM) 710, and/or non-volatile memory, such as read only memory (ROM) 712. A basic input/output system (BIOS) 714, containing the basic routines that help to transfer information between elements within computer 702, such as during start-up, is stored in ROM 712. RAM 710 typically contains data and/or program modules that are immediately accessible to and/or presently operated on by the processing unit 704.

Computer 702 can also include other removable/non-removable, volatile/non-volatile computer storage media. By way of example, FIG. 9 illustrates a hard disk drive 716 for reading from and writing to a non-removable, non-volatile magnetic media (not shown), a magnetic disk drive 718 for reading from and writing to a removable, non-volatile magnetic disk 720 (e.g., a "floppy disk"), and an optical disk drive 722 for reading from and/or writing to a removable, non-volatile optical disk 724 such as a CD-ROM, DVD-ROM, or other optical media. The hard disk drive 716, magnetic disk drive 718, and optical disk drive 722 are each connected to the system bus 708 by one or more data media interfaces 726. Alternatively, the hard disk drive 716, magnetic disk drive 718, and optical disk drive 722 can be connected to the system bus 708 by a SCSI interface (not shown).

The disk drives and their associated computer-readable media provide non-volatile storage of computer readable instructions, data structures, program modules, and other data for computer 702. Although the example illustrates a hard disk 716, a removable magnetic disk 720, and a removable optical disk 724, it is to be appreciated that other types of computer readable media which can store data that is accessible by a computer, such as magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like, can also be utilized to implement the exemplary computing system and environment.

Any number of program modules can be stored on the hard disk 716, magnetic disk 720, optical disk 724, ROM 712, and/or RAM 710, including by way of example, an operating system 726, one or more application programs 728, other program modules 730, and program data 732. Each of such operating system 726, one or more application programs 728, other program modules 730, and program data 732 (or some combination thereof) may include an embodiment of a caching scheme for user network access information.

Computer system 702 can include a variety of computer readable media identified as communication media. Communication media typically embodies computer readable instructions, data structures, program modules, or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

A user can enter commands and information into computer system 702 via input devices such as a keyboard 734 and a pointing device 736 (e.g., a "mouse"). Other input devices 738 (not shown specifically) may include a microphone, joystick, game pad, satellite dish, serial port, scanner, and/or the like. These and other input devices are connected to the processing unit 604 via input/output interfaces 740 that are coupled to the system bus 708, but may be connected by other interface and bus structures, such as a parallel port, game port, or a universal serial bus (USB).

A monitor 742 or other type of display device can also be connected to the system bus 708 via an interface, such as a video adapter 744. In addition to the monitor 742, other output peripheral devices can include components such as speakers (not shown) and a printer 746 which can be connected to computer 702 via the input/output interfaces 740.

Computer 702 can operate in a networked environment using logical connections to one or more remote computers, such as a remote computing device 748. By way of example, the remote computing device 748 can be a personal computer, portable computer, a server, a router, a network computer, a peer device or other common network node, and the like. The remote computing device 748 is illustrated as a portable computer that can include many or all of the elements and features described herein relative to computer system 702.

Logical connections between computer 702 and the remote computer 748 are depicted as a local area network (LAN) 750 and a general wide area network (WAN) 752. Such networking environments are commonplace in offices, enterprise-wide computer networks, intranets, and the Internet. When implemented in a LAN networking environment, the computer 702 is connected to a local network 750 via a network interface or adapter 754. When implemented in a WAN networking environment, the computer 702 typically includes a modem 756 or other means for establishing communications over the wide network 752. The modem 756, which can be internal or external to computer 702, can be connected to the system bus 708 via the input/output interfaces 740 or other appropriate mechanisms. It is to be appreciated that the illustrated network connections are exemplary and that other means of establishing communication link(s) between the computers 702 and 748 can be employed.

In a networked environment, such as that illustrated with computing environment 700, program modules depicted relative to the computer 702, or portions thereof, may be stored in a remote memory storage device. By way of example, remote application programs 758 reside on a memory device of remote computer 748. For purposes of illustration, application programs and other executable program components, such as the operating system, are illustrated herein as discrete blocks, although it is recognized that such programs and components reside at various times in different storage components of the computer system 702, and are executed by the data processor(s) of the computer.

CONCLUSION

Although the systems and methods have been described in language specific to structural features and/or methodological steps, it is to be understood that the technology defined in the appended claims is not necessarily limited to the specific features or steps described. Rather, the specific features and steps are disclosed as preferred forms of implementing the claimed invention.

We claim:

1. A network system, comprising:
a first device to maintain an original resource;
a second device to maintain a replica resource remotely from the first device, the replica resource being replicated from the original resource;
memory to store a cached descriptor corresponding to the original resource;
a security component to determine whether a request for the replica resource will pose a security risk comprising a buffer overrun to the second device where the request designates a resource locator, wherein the request further designates the resource locator having a plurality of arguments, and wherein the security component determines that the request is not a security risk if individual arguments do not exceed a maximum number of characters, and if a total number of characters defining all of the arguments do not exceed a maximum number of characters, the security component further configured to determine whether the replica resource will pose a security risk to the second device upon receipt of a request for the replica resource, the security component configured to:
formulate a descriptor corresponding to the replica resource and compare the formulated descriptor with the cached descriptor; and
if the formulated descriptor and the cached descriptor are not equivalent, formulate a second descriptor corresponding to the original resource and compare the formulated descriptor with the second descriptor.

2. A network system as recited in claim 1, wherein the security component determines that the replica resource is not a security risk if the formulated descriptor and the cached descriptor are equivalent.

3. A network system as recited in claim 1, wherein, if the formulated descriptor and the cached descriptor are not equivalent, and if the formulated descriptor and the second descriptor are equivalent, the security component determines that the replica resource is not a security risk.

4. A network system as recited in claim 1, wherein, if the formulated descriptor and the cached descriptor are not equivalent, and if the formulated descriptor and the second descriptor are equivalent, the security component determines that the replica resource is not a security risk, and the cached descriptor is replaced with the second descriptor.

5. A network system as recited in claim 1, wherein, if the formulated descriptor and the cached descriptor are not equivalent, and if the formulated descriptor and the second descriptor are not equivalent, the security component determines that the replica resource is a security risk, and the replica resource is replaced with a copy of the original resource.

6. A network system as recited in claim 1, wherein, if the formulated descriptor and the cached descriptor are not equivalent, and if the formulated descriptor and the second descriptor are not equivalent, the security component determines that the replica resource is a security risk, the replica resource is replaced with a copy of the original resource, and the cached descriptor is replaced with the second descriptor.

7. A network system as recited in claim 1, wherein the security component formulates the cached descriptor when the original resource is replicated to create the replica resource.

8. A network system as recited in claim 1, wherein the request further designates the resource locator having a resource identifier, and wherein the security component determines that the request is not a security risk if the resource identifier has a valid file extension.

9. A network system as recited in claim 1, wherein:
the request further designates the resource locator having a resource path and one or more arguments, the resource path identifying a location of the replica resource and the resource path having a resource identifier;
the security component determines that the request is not a security risk if:
the resource path does not exceed a maximum number of characters;
individual arguments do not exceed a maximum number of characters;
a total number of characters defining all of the arguments do not exceed a maximum number of characters; and
the resource identifier has a valid file extension.

10. A network server, comprising:
a server component to receive a request for a resource maintained on the network server and, in response to the request, implement security policies to prevent unauthorized access to the resource;
a memory to store a cached descriptor corresponding to the resource; and
a security component that is registerable with the server component during run-time to determine whether the request will pose a security risk comprising a buffer overrun to the network server, the request posing the security risk if the resource has been corrupted and if execution of the resource will compromise the network server, the security component being configured to:
formulate a replica descriptor corresponding to a replica of the resource and compare the replica descriptor with the cached descriptor;
if the replica descriptor and the cached descriptor are not equivalent, formulate a second descriptor corresponding to the resource and compare the replica descriptor with the second descriptor; and wherein the request designates a resource locator having a resource path and one or more arguments, the resource path identifying a location of the resource and the resource path having a resource identifier, and wherein the security component determines that the request is not a security risk if a total number of characters defining all of the arguments do not exceed a maximum number of 2,068 characters and the resource identifier has a valid file extension.

11. A network server as recited in claim 10, wherein, if the security component determines that the request will pose a security risk to the network server, the security component redirects the request to indicate that the resource is not available.

12. A network server as recited in claim 10, wherein the request designates a resource locator having a resource path, the resource path identifying a location of the resource, and wherein the security component determines that the request is not a security risk if the resource path does not exceed a maximum number of characters.

13. A network server as recited in claim 10, wherein the request designates a resource locator having a resource identifier, and wherein the security component determines that the request is not a security risk if the resource identifier has a valid file extension.

14. A network server as recited in claim 10, wherein:
the security component determines that the request is not a security risk if:
the resource path does not exceed a maximum number of characters.

15. A network server system, comprising:
a server component in a network server to receive a request for a resource maintained on the network server, the request designating a resource locator having a resource path that identifies a location of the resource, and, in response to the request, implement security policies to prevent unauthorized access to the resource;
a memory to store a cached descriptor corresponding to the resource; and
a security component in a computing device remote to the network server and registerable with the server component during run-time to determine whether the resource will pose a security risk to the network server upon receipt of the request, wherein the request further designates the resource locator having a plurality of arguments, and wherein the security component determines that the request is not a security risk if individual arguments do not exceed a maximum number of characters, and if a total number of characters defining all of the arguments do not exceed a maximum number of characters, the security component being configured to:
formulate a replica descriptor corresponding to a replica of the resource and compare the replica descriptor with the cached descriptor; and
if the replica descriptor and the cached descriptor are not equivalent, formulate a second descriptor corresponding to the resource and compare the replica descriptor with the second descriptor.

16. A network server system as recited in claim 15, wherein, if the security component determines that the resource will pose a security risk, the security component redirects the request to indicate that the resource is not available.

17. A network server system as recited in claim 15, wherein the security component:
formulates a descriptor corresponding to the resource;
compares the formulated descriptor with a cached descriptor, the cached descriptor corresponding to the resource and formulated when the resource is initially requested; and
determines that the resource is not a security risk if the formulated descriptor and the cached descriptor are equivalent.

18. A network server system as recited in claim 15, wherein the security component:
formulates a descriptor corresponding to the resource;
compares the formulated descriptor with a cached descriptor, the cached descriptor corresponding to the resource and formulated when the resource is initially requested;
if the formulated descriptor and the cached descriptor are not equivalent, formulates a second descriptor corresponding to an original resource maintained on a file server remotely located from the network server, the resource being replicated from the original resource;
compares the formulated descriptor with the second descriptor; and
determines that the resource is not a security risk if the formulated descriptor and the second descriptor are equivalent.

19. A network server system as recited in claim 15, wherein the security component:
formulates a descriptor corresponding to the resource;
compares the formulated descriptor with a cached descriptor, the cached descriptor corresponding to the resource and formulated when the resource is initially requested;
if the formulated descriptor and the cached descriptor are not equivalent, formulates a second descriptor corresponding to an original resource maintained on a file server remotely located from the network server, the resource being replicated from the original resource;
compares the formulated descriptor with the second descriptor;
if the formulated descriptor and the second descriptor are not equivalent, initiates that the resource stored on the network server be replaced with a copy of the original resource maintained on the file server; and
initiates that the cached descriptor be replaced with the second descriptor.

\* \* \* \* \*